PARAMETRIC DEVICES INCORPORATING VARACTOR DIODES

INVENTOR
John A. Dodson
BY Kemon Palmer, Stewart & Estabrook
ATTORNEYS

INVENTOR
John A. Dodson
BY Kemon, Palmer, Stewart & Estabrook
ATTORNEYS

Inventor:
John A. Dodson
By Kemon, Palmer, Stewart and Estabrook
Attorneys

United States Patent Office
3,378,690
Patented Apr. 16, 1968

3,378,690
PARAMETRIC DEVICES INCORPORATING VARACTOR DIODES

John Arthur Dodson, Chelmsford, England, assignor to G. & E. Bradley Limited, London, England
Filed Jan. 10, 1966, Ser. No. 519,496
Claims priority, application Great Britain, Jan. 13, 1965, 1,563/65
19 Claims. (Cl. 307—88.3)

ABSTRACT OF THE DISCLOSURE

Amplifiers, frequency multipliers, and up, or down, converters are described in each of which a varactor diode is mounted in a waveguide whose cut-off frequency is above the frequency of one of the signals which must propagate if the device is to function efficiently. The cut-off frequency in the vicinity of the diode is then reduced, preferably by means of dielectric material surrounding the diode, so that the above mentioned signal can propagate in the region of the diode. A wide-band circuit for this signal is thus provided and the device also has a wide bandwidth.

The present invention relates to parametric amplifiers, frequency converters and frequency multipliers which use varactor diodes.

In a parametric amplifier a signal at a first frequency is "pumped," that is power is transferred to the signal, by a second or pump signal at a second frequency. A third, or idler, signal whose frequency equals the difference between the pump-signal frequency and the first frequency, is necessary to allow the transfer of power to take place. If in an amplifier using a varactor diode, broadband amplification is required then the part of the circuit supporting the idler signal must have wide band response. To achieve such a response has, in the past, been difficult and required the design of a complicated circuit which was then only useful for a small range of signal frequencies, unless major idler circuit changes were made.

In a parametric frequency multiplier, using a varactor diode, a signal at a fundamental frequency is applied to the diode, and signals at harmonic frequencies are generated. Where third or higher harmonics are taken as output signals provision must be made for signals at lower harmonics to flow. For instance where the output signal is the third harmonic, a circuit for the second harmonic should be provided. The principal advantage of the present invention in relation to varactor frequency multipliers is that it increases their efficiency, efficiencies of up to 50% having been achieved in a tripler having an output frequency of 36 gc./s.

In an up-converter, using a varactor diode, a signal at a first frequency $f_1$ is applied to the diode together with a pump signal of frequency $f_2$. Signals at $f_2 \pm f_1$ can then be taken at the diode as output signals. In addition to increasing the efficiency of up-converters, the present invention allows a reduction in the number of filters used.

According to the present invention there is provided a parametic device comprising a waveguide having two different cut-off frequencies in two different regions thereof respectively and a varactor diode mounted in the region of lower cut-off frequency.

Waveguide in this specification means any transmission line having a cut-off frequency, so that signals below the cut-off frequency are not supported by the waveguide.

In a preferred device according to the invention the waveguide is rectangular and has the same cross-sectional dimensions in the two regions, the cut-off frequency of the region containing the diode being reduced by surrounding the diode with solid dielectric. The cut-off frequency of one region of the waveguide may be reduced in other ways. For example a ridge may be present in the region of lower cut-off frequency or a section of waveguide of different dimensions may be used.

Figure 1A:
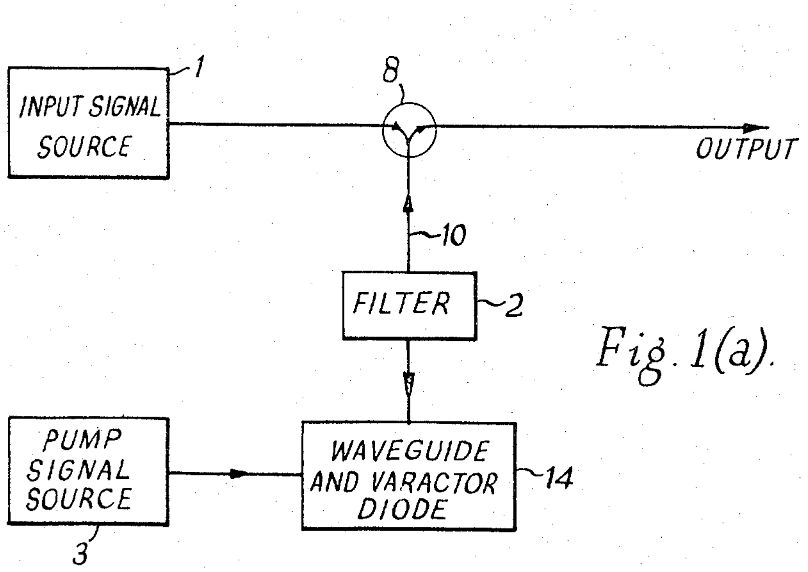

The invention will now be described by way of example with reference to the accompanying drawings, in which:

FIGS. 1*a*, *b* and *c* are block diagrams of a parametric amplifier, a frequency multiplier, and a frequency converter according to the invention.

Figure 2:
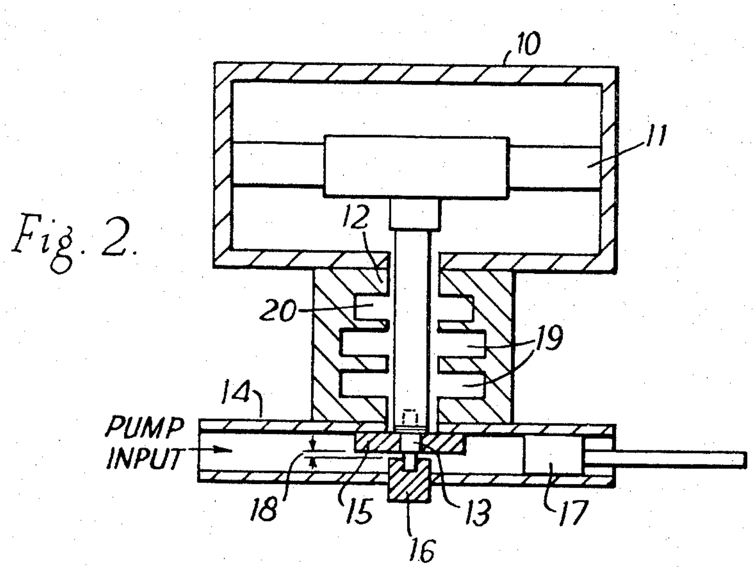
Figure 3:
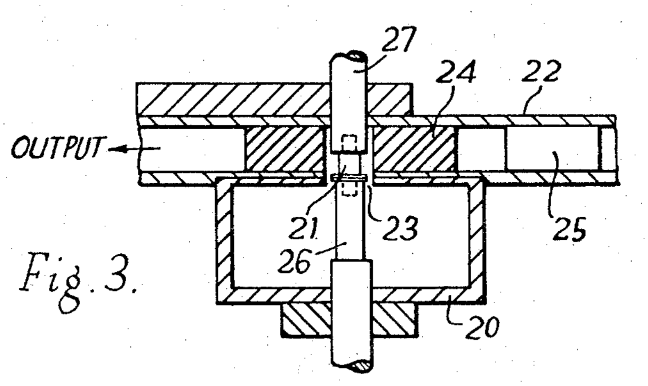
Figure 4:
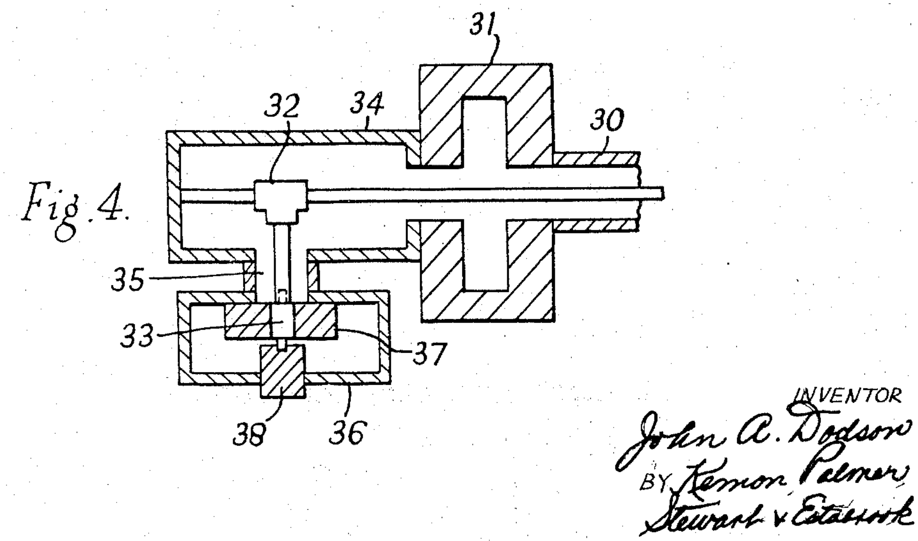
Figure 1D:
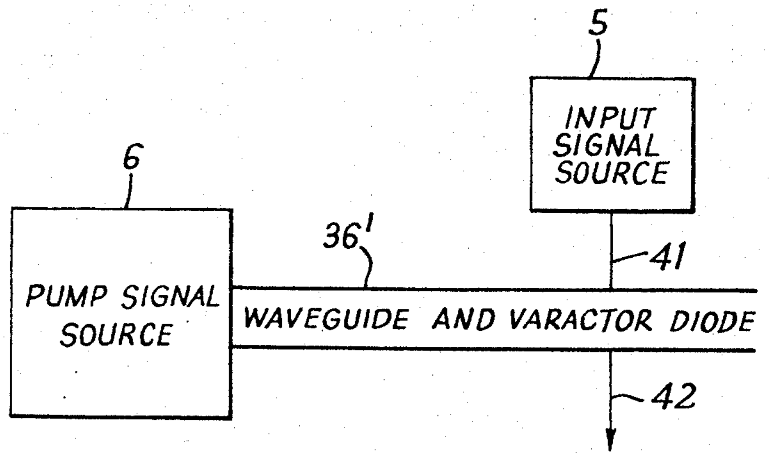

FIG. 2 is a sectional view of a parametric amplifier according to the invention, FIG. 3 is a sectional view of a frequency multiplier according to the invention, and FIG. 4 is a sectional view of a frequency converter according to the invention.

In the block diagram of a parametric amplifier (FIG. 1*a*) an input signal source 1 passes signals of frequency $f_s$ by way of a circulator 8, a waveguide 10, and a filter 2, consisting of two chokes 19 and 20 (see FIG. 2) to a waveguide 14 in which a varactor diode 13 is mounted. A pump signal source 3 applies signals of frequency $f_p$ to the diode 13, and as a result an idler signal at frequency $f_I = f_p - f_s$ is generated and the signals of frequency $f_s$ are amplified.

The amplified output signal passes back through the filter 2, in the opposite direction to the input signal, and appears at a different part of of the circulator 8 from that used to supply the input signal.

Referring now to FIG. 2 as has been mentioned, the signal to be amplified is propagated through a waveguide 10 which contains a bar and post transition 11 coupling a coaxial line 12 to the waveguide 10. The centre conductor of the coaxial line 12 supports one end of a varactor diode 13 which is located across the centre of a waveguide 14 and extends in the direction of the smaller waveguide dimension. The waveguide 14 supports the pump signal. A slice of poly - tetra - fluoro - ethylene (P.T.F.E.) 15 which surrounds the diode 13 and which extends across the broad dimension of the waveguide is as thick as the capsule of the diode is long, and has a length approximately equal to one wavelength at the idler frequency, that is the difference between the signal and pump frequencies.

The cut-off frequency of the waveguide 14 which is above the idler frequency is reduced in the vicinity of the diode 13 by the P.T.F.E. slice so that the idler frequency can propagate in this region.

The end of the diode 13 remote from the line 12 is supported by a matching stud 16 which is mounted at the centre of the broad dimension of the waveguide 14. The stud 16 also serves with a plunger 17 to terminate the waveguide 14 and to concentrate pump power at the diode. Since the coupling of the idler circuit to the diode 13 depends in part on the gap 18 between the slice 15 and the stud 16, the amplifier can be made capable of using a range of different diodes by making the gap 18 variable.

The idler and pump signals are prevented from reaching the signal waveguide 10 by an idler choke 19 and a pump choke 20.

Since the idler signal is confined to the region of the P.T.F.E. the circuit components forming the idler circuit are located close to the diode 13. The energy stored by the idler circuit is therefore low compared with idler circuits in known parametric devices, where the volume of the idler circuit is much larger. The idler circuit therefore has a low Q factor and its characteristics are therefore not particularly frequency dependent over a wide frequency range and the wide band response required for the idler circuit is achieved. Another advantage in surrounding the diode with dielectric is that better coupling is achieved between the idler circuit and the diode, and a greater overall efficiency is obtained.

In a specific example, a parametric amplifier having a pump signal of 27.0 gc./s. was used to amplify a signal of 7.1 gc./s. The pump waveguide would not support the idler frequency of 19.9 gc./s. since its cut-off frequency was 21.1 gc./s. However in the region of the diode a P.T.F.E. slice was used to reduce the cutoff frequency to below 19.9 gc./s. A smooth gain characteristic having a bandwidth of 200 mc./s. to 400 mc./s. at a gain of 16 db was obtained for the amplifier in the 7 gc./s. region.

Figure 1B:
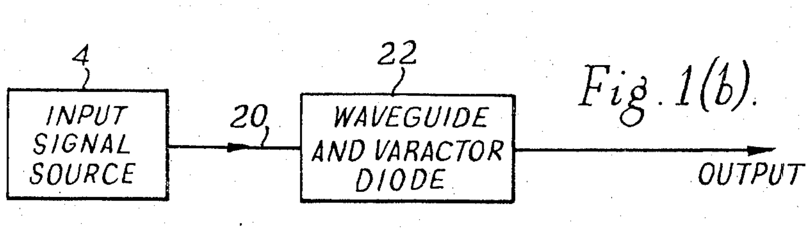

The frequency multiplier of FIGS. 1*b* and 3 will now be described. A signal at a fundamental frequency, from an input signal source 4 is fed along a waveguide 20 which is coupled at an aperture 23, to a diode 21 supported across a waveguide 22. The diode 21 is surrounded by a slice 24 of P.T.F.E. which fills the waveguide 22. The dimensions of the waveguide 22 are such that it can support the third harmonic of the fundamental but not the second harmonic, except in the region of the P.T.F.E. dielectric. A plunger short circuit 25 is used to terminate the waveguide 22 at one end.

The diode is supported at one end by a post 26 which has an electrical length of a quarter of a wavelength at the fundamental frequency thus forming a resonant circuit and providing good coupling between the input waveguide 20 and the diode 21. However, the electrical length of the post is not three quarters of a wavelength at the third harmonic due to the effects of stray reactance for example between the diode flange and the walls of the waveguide 20, and the capacity of the diode package. Thus the third harmonic is not coupled to any significant extent to the input waveguide 20.

The position of a stud 27 at the end of the diode remote from the post 26 may be varied in the vertical direction to match the diode circuit to the waveguide 20.

The dielectric body need not fill the waveguide as shown in FIG. 3 but its dimensions in the direction of the broad and narrow dimensions of the waveguide 22 may be as required for matching purposes.

The preferred overall electrical length of the dielectric body in the direction of propagation in the waveguide 22 is a resonant length at the second harmonic frequency. Where signals at two harmonic frequencies are to be supported by that part of the waveguide containing the dielectric body, for example when the output frequency is the fifth harmonic and both the second and third harmonics are to be supported, then the electrical lengths of the portions of the dielectric body to the left and right of the diode in FIG. 1 may be resonant at the second and third harmonics respectively. Where signals at three harmonic frequencies have to be supported by the part of the waveguide containing the dielectric body the overall electrical length of the body may be resonant at the lowest harmonic, and the parts to the left and right of the diode resonant at the other two harmonics. In this way multiplication up to sixteen times can be achieved since three idler circuits at the second, fourth and eighth harmonics can be provided, and these idler circuits will also support signals at multiples of the harmonics mentioned. In practice it is found that idler circuits need not be provided for certain harmonics for example in multiplying by sixteen, idler circuits for the third, fifth, sixth, and other harmonics which are not sub-harmonics of sixteen can be omitted.

In FIG. 3, a complex circuit to support the second harmonic and to prevent it reaching the multiplier output is avoided. In addition high efficiency is obtained because the P.T.F.E. slice provides good coupling between the idler circuit and the diode. Another advantage, that of wide band response, is achieved because the components forming the idler circuit are located close to the diode, and the characteristics of the idler circuit are therefore not particularly frequency dependent. A wide bandwidth is useful in frequency multipliers, when the input signal is frequency modulated, and also in up-converters.

In another embodiment of the invention the waveguide 20 is replaced by a coaxial line which is provided with a step or taper transformer if necessary to match the coaxial line to the diode circuit.

Figure 1C:
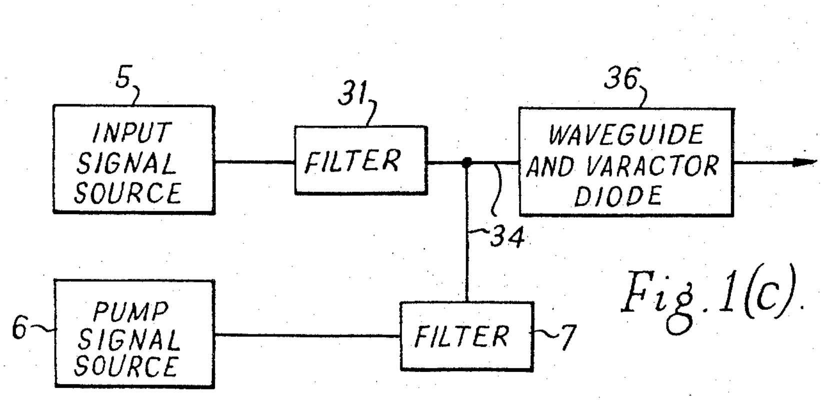

The frequency changer or up converter of FIGS. 1*c* and 4 will now be described. An input signal of frequency $f_1$, from an input signal source 5 is propagated along a coaxial line 30 through a filter or choke 31 to a bar and post transition 32 and thence to a varactor diode 33. A pump signal of frequency $f_2$ from a pump signal source 6 is passed by way of a filter 7 to a waveguide 34. The filter 7 prevents signals at frequencies $f_1$ and $f_2 \pm f_1$ reaching the pump source 6. The waveguide 34 is coupled through an aperture 35 to the varactor diode. The pump signal is prevented by the choke 31 from reaching the coaxial line 30. Signals at frequencies $f_2 \pm f_1$ are generated at the diode which is supported in a waveguide 36 whose cut-off frequency is below $f_2+f_1$ but above $f_2$ and hence above $f_2-f_1$. Thus only the output signal $f_2+f_1$ is allowed to propagate along the output waveguide 36. A P.T.F.E body 37 surrounds the diode and lowers the cut-off frequency of the waveguide 36 in the region of the body so that a signal of frequency $f_2$, and if maximum efficiency is required, a signal $f_2-f_1$, can be supported. Allowing both idler frequencies $f_2 \pm f_1$ to propagate increases efficiency marginally over the efficiency achieved when only one idler signal propagates.

The P.T.F.E body improves the coupling between the pump circuit and the diode and hence good efficiencies can be obtained. Output filters are not required since the output waveguide can only support the output signal.

Matching between the coaxial line 30, the two waveguides, and the diode can be aided by choice of the dimensions of the body 37 which can be varied in the directions of both the broad and narrow dimensions of the waveguide 36. The body may fill the waveguide 36. Variation of the vertical position of a post 38 may also be used for matching purposes.

In another embodiment the pump signal may also be applied to the diode by a coaxial line instead of the waveguide 34. Further in a different arrangement the varactor diode may be located in a waveguide which will support the pump signal but not a signal at the frequency $f_2-f_1$, except in the region of the body where the cut-off frequency of the waveguide is reduced by a dielectric body surrounding the diode. A signal of frequency $f_1$ is supplied to the diode by a coaxial line or waveguide and the output frequency $f_2 \pm f_1$ is extracted also by means of a further coaxial line or waveguide.

As for frequency multipliers, in up-converters the electrical length of the body of dielectric material, either to the right or left of the diode, and/or the overall length is a resonant length at the frequency or frequencies to be supported in the region of the body.

In all embodiments the diode may be self biased as shown in the figures or it may be biased in the conventional manner using a direct current.

Where solid dielectric material is used, instead of the dielectric material surrounding the diode capsule, the diode may be encapsulated in a body of dielectric material of sufficient size to lower the cut-off frequency so that a signal at another frequency, for example $2f$ in FIG. 3 or $f_2-f_1$ in FIG. 4, than that normally propagated can be supported in the region of the body.

Instead of one varactor diode, two or more may be used in parallel where more output power is required.

The dielectric material used in any of the above mentioned devices may be a liquid or gas confined to the region of the varactor diode.

What is claimed is:

1. A parametric amplifier, comprising:

an input-signal source for providing signals, of frequency $f_s$, to be amplified;

a pump signal source for providing a pump signal of frequency $f_p$;
a waveguide having a cut-off frequency below the frequency $f_p$ but above a frequency $f_p-f_s$, said waveguide being coupled to said pump-signal source;
a varactor diode mounted in said waveguide;
means for so reducing said cut-off frequency to below the frequency $f_p-f_s$ adjacent to said diode that the waveguide propagates the frequency $f_p-f_s$ in the region of said diode; and
a transmission line coupling said input signal source to said diode.

2. A parametric amplifier according to claim 1 wherein said region includes dielectric of higher dielectric constant than is contained by the remainder of the waveguide.

3. A parametric amplifier according to claim 2 wherein said dielectric is solid dielectric.

4. A parametric amplifier according to claim 3 wherein said waveguide has constant cross-sectional dimensions.

5. A parametric amplifier according to claim 1 wherein said means comprises a body of dielectric material surrounding said diode.

6. A parametric amplifier according to claim 5 wherein said waveguide is rectangular, said diode extends across the narrow dimension of the said waveguide and said dielectric body extends only part way across the said narrow dimension.

7. A parametric amplifier according to claim 5 wherein said transmission line includes,
a first choke to reject said pump frequency $f_p$, and
a second choke to reject said idler frequency $f_I$.

8. A parametric amplifier according to claim 5 wherein the electrical length of the dielectric material in the direction of propagation is a resonant length at the frequency $f_I=f_p-f_s$.

9. A parametric frequency multiplier, including
an input signal source for providing signals at a fundamental frequency $f$,
a waveguide having a cut-off frequency below a frequency $mf$ but above a frequency $nf$, where $m$ and $n$ are whole numbers and $m$ is greater than $n$,
means for reducing the cut-off frequency of a region of said waveguide to below the frequency $nf$, to allow an idler signal at the frequency $nf$ to propagate in the same region,
a varactor diode mounted in said region, and
a transmission line coupled between said signal source and said diode,
the output signal of the multiplier at the frequency $mf$ being taken from said waveguide.

10. A frequency multiplier device according to claim 9 wherein said means is a body of dielectric material.

11. A frequency multiplier according to claim 10 wherein the electrical length of said body, in the direction of propagation along said waveguide, is resonant at the frequency $nf$.

12. A frequency multiplier according to claim 11 wherein said dielectric body surrounds said diode.

13. A frequency multiplier according to claim 11 wherein said waveguide is a rectangular waveguide, one terminal of said diode is in contact with said waveguide, and said dielectric body extends only part way across the narrow dimension of said waveguide.

14. A frequency multiplier according to claim 10 wherein the electrical length of said body on one side of said diode, in the direction of propagation along said waveguide, and the electrical length on the opposite side of the diode, are resonant lengths at different lower harmonics of said fundamental frequency $f$ than the harmonic $mf$, the lower of said different lower harmonics having a frequency of at least $nf$.

15. A frequency multiplier according to claim 14 wherein the overall electrical length of said body in said direction of propagation is a resonant length at the frequency $nf$, said different lower harmonics having frequencies greater than $nf$.

16. A parametric frequency multiplier, including
an input signal source for providing signals at a fundamental frequency $f$,
a rectangular waveguide having a cut-off frequency below a frequency $mf$ but above a frequency $nf$, where $m$ and $n$ are whole numbers and $m$ is greater than $n$,
a body of dielectric material mounted in said waveguide to reduce said cut-off frequency to below the frequency $nf$ in the region of said body to allow an idler signal at the frequency $nf$ to propagate in the said region, said body extending only part way across the narrow dimension of said waveguide and having an electrical length in the direction of propagation along said waveguide which is resonant at the frequency $nf$,
a varactor diode mounted across the narrow dimension of said waveguide, surrounded by said body, having one terminal in contact with said waveguide, and a transmission line coupled between said input-signal source and the other terminal of said diode.

17. A frequency changer or up-converter, including
an input signal source for providing a signal at a frequency $f_1$,
a pump signal source for providing a pump signal at a frequency $f_2$,
a waveguide having a cut-off frequency below the frequency $f_2+f_1$ but above the frequency $f_2$, an output signal at the frequency $f_2+f_1$ being taken from the waveguide,
a varactor diode mounted in said waveguide,
means so reducing said cut-off frequency to below the frequency $f_2$ adjacent to said diode that the waveguide propagates the frequency $f_2$ in the region of said diode and
first and second transmission lines coupling said input-signal source and said pump-signal source to said region respectively.

18. A frequency changer according to claim 17, wherein said means is a body of dielectric material.

19. A frequency changer according to claim 18 wherein the electrical length of said body in the direction of propagation of said waveguide is a resonant length at the frequency $f_2$.

References Cited

UNITED STATES PATENTS

| | | | |
|---|---|---|---|
| 3,230,465 | 1/1966 | Steinke | 330—4.9 |
| 3,237,132 | 2/1966 | Okaya | 330—4 |
| 3,259,847 | 7/1966 | Vilcans | 330—4.9 |
| 3,300,729 | 1/1967 | Chang | 330—4.9 |

OTHER REFERENCES

Vincent et al., "1962 International Solid-State Circuits Conference," pp. 20–21, 330–4.9.

Clorfeine, "Proceedings of the IEEE," July 1964, pp. 884–845, 307–88.3.

ROY LAKE, *Primary Examiner.*

D. R. HOSTETTER, *Assistant Examiner.*